(12) United States Patent
Nakamura et al.

(10) Patent No.: US 6,212,043 B1
(45) Date of Patent: Apr. 3, 2001

(54) DAMPING MATERIAL FOR A HEAD SUSPENSION OF A MAGNETIC HEAD

(75) Inventors: Masao Nakamura; Hiroyuki Iida; Motoshige Tatsumi; Hidetsugu Toyota, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 08/984,159

(22) Filed: Dec. 3, 1997

(30) Foreign Application Priority Data

Dec. 3, 1996 (JP) .................................................. 8-322953

(51) Int. Cl.[7] ........................................................ G11B 5/48
(52) U.S. Cl. ................................................. 360/244.3
(58) Field of Search ..................................... 360/104

(56) References Cited

U.S. PATENT DOCUMENTS

| 4,819,094 | 4/1989 | Oberg | 360/104 |
| 5,825,590 | 10/1998 | Ohwe | 360/104 |

*Primary Examiner*—George J. Letscher
(74) *Attorney, Agent, or Firm*—Sughrue, Mion, Zinn, Macpeak & Seas, PLLC

(57) ABSTRACT

The damping material is mounted over the flat part to the curved part of a supporting arm of a head supporting spring of a disk unit composed of a magnetic head, the head suspension which supports the former and a fixing block that fixes the suspension, and the rate of change in static spring constant of the head supporting spring mounted with the damping material is set within 20% in comparison with the static spring constant of the un-mounted head supporting spring. As the constraining body, a metal foil or a resin film is used.

3 Claims, 8 Drawing Sheets

SYSTEM LOSS FACTOR TEMPERATURE CHARACTERISTICS

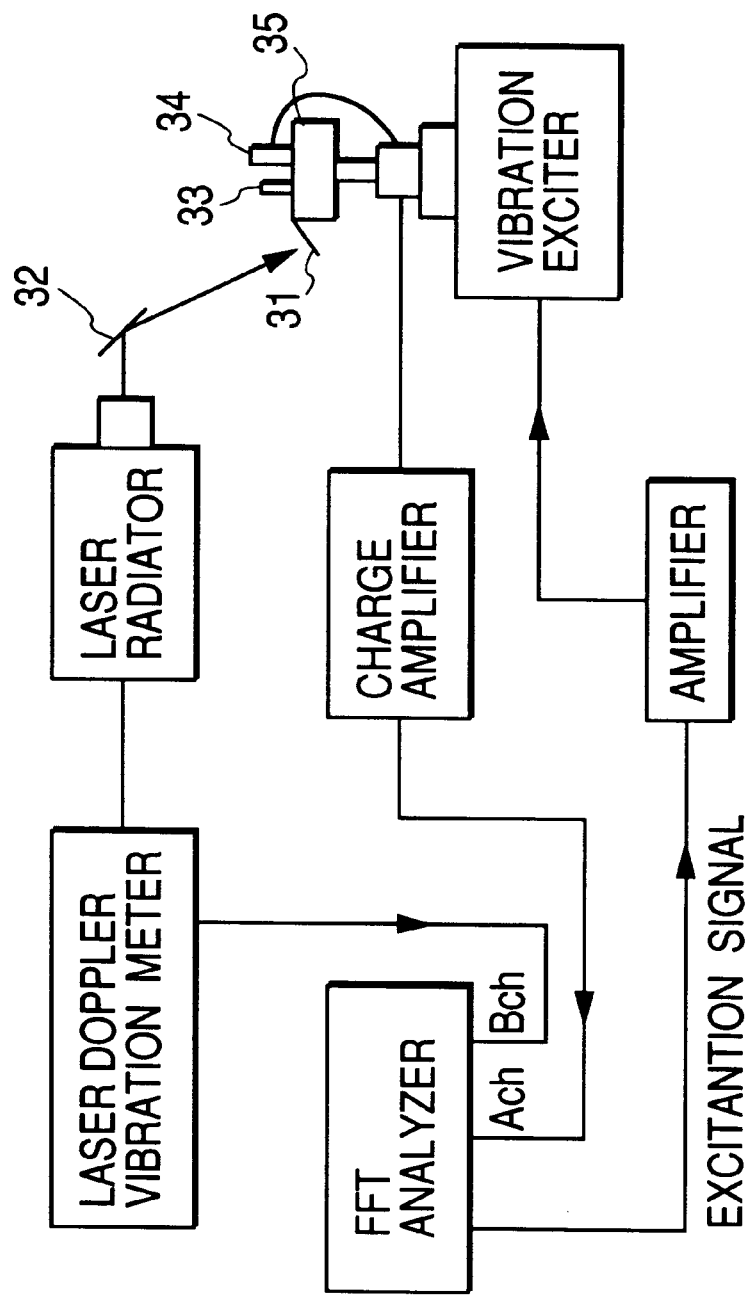

COMPARISON WITH THE CASE OF NO TREATMENT
AND THE CASE OF PI CONSTRAINING BODY

COMPARISON WITH THE CASE OF NO TREATMENT
AND THE CASE OF PASTED POSITIONS B AND C

COMPARISON WITH THE CASE OF PI CONSTRAINING BODY AND THE CASE OF SUS CONSTRANING BODY

DAMPING MATERIAL FOR A HEAD SUSPENSION OF A MAGNETIC HEAD

BACKGROUND OF THE INVENTION

1. Field of the Invention

This invention relates to a damping material which is pasted on the head suspension of disk units and to a head suspension with the damping material.

2. Description of the Prior Art

The head for use in magnetic disk units such as a hard disk drive (HDD), a magneto optical drive and the like floats by keeping a minute space on a magnetic disk which is spinning at a high speed, thereby carrying out read/write of information on the disk. With the demand for high recording density in recent years, the head size and floating quantity have been minimized, so that, in order to effect read/write of information on the magnetic disk exactly, it is important to locate the head part precisely while suppressing its vibration.

As shown in FIGS. 10A to 10C, the structure of a head suspension is generally constructed with a magnetic head 1, a head supporting spring 2 which supports the head and a fixing block 3 which fixes the suspension.

Since the aforementioned head part receives vibration from, for example, a drive unit of the head 1 and a motor for use in the spin drive of disks, the head supporting spring 2 formed with a plate spring or the like is deformed and the position of the head 1 slips off, thus frequently causing errors in reading and writing. In consequence, in order to decrease or remove vibration in the head supporting spring 2, a method has been proposed in which a damping material 4 prepared by laminating a constraining body and a visco-elastic body is pasted on the linear part of the head supporting spring 2 (Japanese Patent Publication No. Hei. 4-8868). According to this method, the visco-elastic body interposed between the vibrating head supporting spring 2 and the constraining body deforms accompanied by the vibration deformation of the head supporting spring 2, thereby generating internal resistance (molecular friction) which converts the vibration energy into thermal energy, and thus exerting a damping effect in which the vibration energy the head suspension will directly receive is greatly reduced.

It is important that the constraining body has high rigidity in order to improve the just described damping effect, and a metal plate such as of stainless steel is generally used as the constraining body. Also, an adhesive, rubber or the like is used as the visco-elastic body.

However, since vibration absorption of the head suspension disclosed in Japanese Patent Publication No. Hei. 4-8868 is still insufficient, further improvement of the effect has been expected. Since the recent tendency toward multimedia performance demands high memory capacity, high memory density and high speed read/write, it becomes more and more important to precisely locate the head and head suspension parts while suppressing their vibration, in order to effect read/write of information on the magnetic disk exactly.

SUMMARY OF THE INVENTION

The present invention has been made taking such circumstances into consideration, and it contemplates providing a damping material which is light and inexpensive and has excellent damping effect and a head suspension in which the damping material is used.

In order to achieve the aforementioned object, the head suspension of the present invention has a construction in which a damaging material is mounted over the flat part to the curved part of the supporting arm of a head supporting spring of a disk unit, wherein rate of change in static spring constant of the head supporting spring mounted with the damping material is within 20% in comparison with the static spring constant of the unmounted head supporting spring.

In the above construction, it is desirable that the damping material is a laminate in which a constraining body having a rigidity (modulus of elasticity×thickness) of 100 kg/mm or less and a visco-elastic body made of an acrylic adhesive are pasted together.

Next, the damping material of the present invention is a damping material to be used in the just described head suspension, having a construction in which a constraining body having a rigidity (modulus of elasticity×thickness) of 100 kg/mm or less is laminated with a visco-elastic body made of an acrylic adhesive. The rigidity exceeding 100 kg/mm is not desirable, because the spring constant of the head suspension becomes too high.

In the above construction, it is desirable that the thickness of the acrylic adhesive layer is within the range of from 20 to 250 μm.

BRIEF DESCRIPTION OF THE DRAWINGS

In the accompanying drawings:

FIG. 5 shows a method for measuring a damping effect according to an example of the present invention;

DETAILED DESCRIPTION OF THE PREFERRED EMBODIMENTS

The mode of carrying out the present invention is described.

Figure 1:
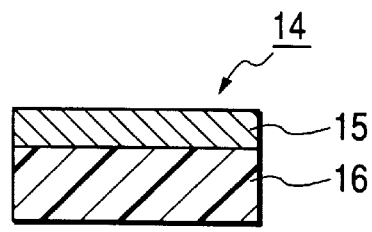
FIG. 1 is a sectional view of a damping material according to a mode of the present invention.

Firstly, as shown in FIG. 1, the damping material of the present invention is a laminated and integrated product of a constraining body 15 and a visco-elastic body made of an acrylic adhesive 16. In this drawing, 14 is a damping material. As the just described constraining body 15, a metal foil film or a resin film can be used. More specifically, aluminum foil, copper foil, polyimide film, polyethylene terephthalate film, aramid film, or the like can be used. When a metal foil film is used in the above, it may have a thickness of preferably from 10 to 50 µm, and, when a resin film is used, it may have a thickness of preferably from 10 to 350 µm.

Also, the aforementioned visco-elastic body 16 uses an acrylic adhesive having superior damping characteristics and heat resistance. In the case of a hard disk drive for example, inner temperature at the time of installed operation reaches 50 to 60° C., so that an adhesive having insufficient heat resistance, for example, rubber adhesive such as a natural rubber, a butyl rubber, styrene-butadiene rubber, cannot be used due to a possibility of causing thermal deformation. In addition, though a silicone base adhesive is known as a heat resistant adhesive, it also cannot be used because of a possibility of contaminating the memory face in the case of HDD and the like.

Examples of the aforementioned acrylic adhesive include those which are obtained by the method disclosed in Japanese Patent Publication No. Hei. 5-132658. According to this method, a (meth)acrylic acid alkyl ester monomer and a monomer having carboxyl group are mixed with a photopolymerization initiator and a crosslinking agent, and the mixture is exposed to ultraviolet rays to obtain an adhesive in the shape of a tape. In general, a compound having 8 to 12 alkyl groups is used as the acrylic acid alkyl ester.

Though not particularly limited, it is desirable in general to set the thickness of the adhesive obtained by the aforementioned method to 20 to 250 µm. When the thickness is larger than 250 µm, volume and weight of the damping material increase, which may cause errors in reading and writing information when the material is pasted on the suspension. Also, the thickness if less than 20 µm would worsen the damping characteristics.

The damping material of the present invention can be obtained by laminating and integrating the aforementioned constraining body 15 and visco-elastic body 16 by an optional method. For example, it may be obtained by a method in which both of these bodies are stuck together with pressure by passing them through rollers or by a method in which they are laminated and pressurized with a press.

Figure 2A:
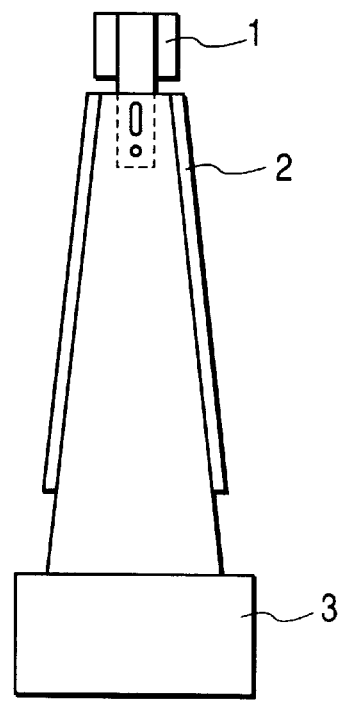
FIG. 2A is a front view of a head suspension before pasting of a damping material of a mode of the present invention.
Figure 2B:
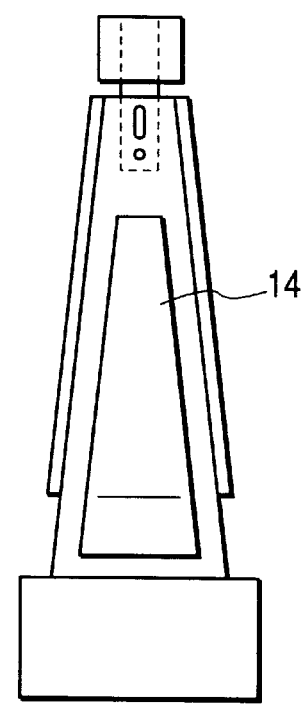
FIG. 2B is a front view of the head suspension after pasting of the damping material.
Figure 2C:
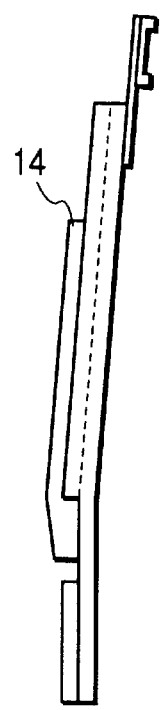
FIG. 2C is a side view of FIG. 2B.

By pasting the aforementioned damping material 14 on flat and curved parts of a head supporting spring 2 equipped with a magnetic head 1 on its tip as shown in FIG. 2, excellent head suspension is obtained which can prevent errors in reading and writing by the head 1. In this connection, 3 is a fixing block. FIG. 2A is a front view of the head suspension before pasting of the damping material 14, FIG. 2B is a front view of the head suspension after pasting of the damping material 14 and FIG. 2C is a side view of FIG. 2B.

The present invention is described further illustratively with reference to the following examples. In the examples, each of the characteristics was measured in the following manner.

(1) Rate of change in spring constant

Figure 3:
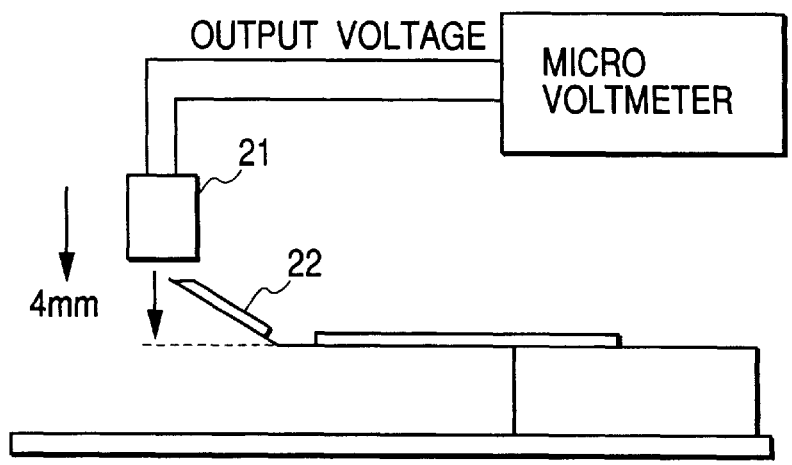
FIG. 3 shows a method for measuring a spring constant according to an example of the present invention.

Using a damping material in which a polyimide (PI) film, a stainless steel (SUS) foil, an aluminum (AL) foil or a polyethylene terephthalate (PET) film was used as the constraining layer, effect of the damping material on the spring constant of a suspension was examined by pasting the material on a bending part of the suspension. As shown in FIG. 3, the measurement was carried out by arranging a suspension 22, applying a load to a gimbal part 21 of a pressure sensor through the output of voltage from a micro voltmeter, measuring the load when the bending part became horizontal and calculating the spring constant from the changed quantity (4 mm).

The results are shown in Table 1. When the change in spring constant was less than 20% as compared with a case in which the damping material was not pasted, the result was expressed by o, and a result of 20% or more by x.

(2) Damping effect

Figure 4:
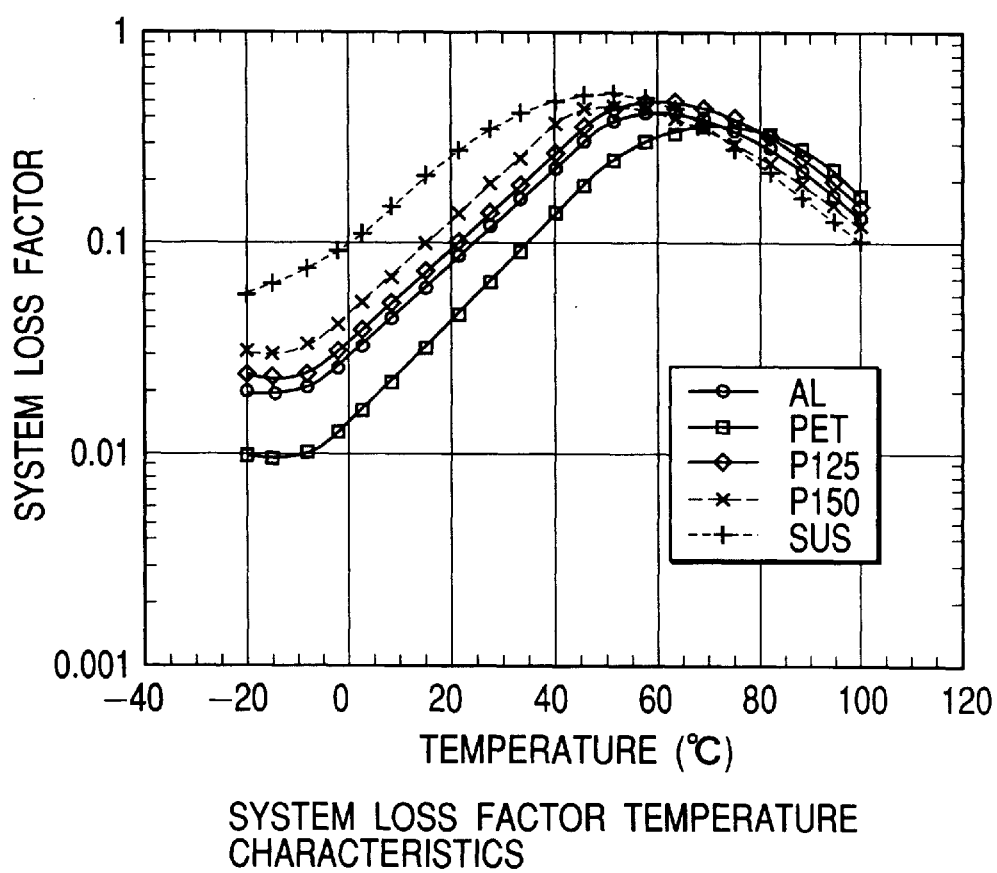
FIG. 4 is a graph showing system loss factor temperature characteristics according to an example of the present invention.

A construction made of SUS having a thickness of 25 µm as a substrate and an acrylic adhesive (DA 8320 (trade name), manufactured by Nitto Denko) having a thickness of 50 µm as a visco-elastic body was fixed, and the damping effect when each material having varied thickness as shown in the table was used as the constraining body was shown as system loss factor temperature characteristics (FIG. 4). When the system loss factor (damping effect) exceeded 0.3 within the range of from 40 to 60° C. as the operating temperature of HDD, the result was expressed by o, and the opposite result by x. The results are shown in Table 1.

TABLE 1

| Experiment No. | Material of constraining body | Thickness (mm) | Modulus of elasticity (kg/mm²) | Rigidity (kg/mm) | Change in spring constant | Damping effect |
|---|---|---|---|---|---|---|
| 1 | PI | 0.025 | 650 | 16.25 | o | o |
| 2 | PI | 0.05 | 650 | 32.5 | o | o |
| 3 (comparative example) | SUS | 0.025 | 20000 | 500 | x | o |
| 4 | AL | 0.01 | 7000 | 70 | o | o |
| 5 | PET | 0.05 | 400 | 20 | o | o |

In this connection, measuring system of the damping effect is shown in FIG. 5. In FIG. 5, 31 is a suspension sample, 32 is a mirror, 33 is a fixing screw, 34 is a acceleration pickup and 35 is a jig for fixing use. In the operation method of the measuring system of FIG. 5, the sample is excited by amplifying an excitation signal output from an FTF analyzer and inputting it in a vibration exciter. The excitation signal is measured by the acceleration pickup 34 and amplified by a charge amplifier, thereby inputting it in Ach of the FTF analyzer as an input signal.

Next, laser radiation is irradiated on the surface of the excited sample, and vibration rate signal of the sample is calculated from the difference in wave length between reflected light and irradiated light and input in Bch of the FTF analyzer. In the FTF analyzer, vibration level (dB) is calculated from the ratio of Bch to Ach (B/A) and treated by Fourier transformation to obtain vibration levels at varied frequencies (FIGS. 7 to 9).

Figure 6A:
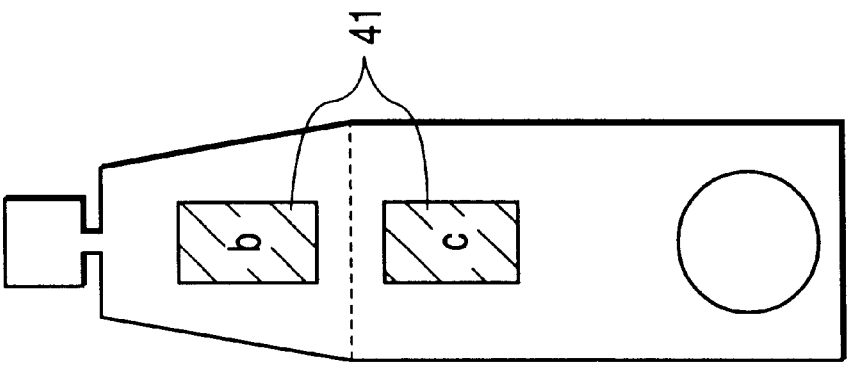
FIG. 6A shows a blank condition of the damping treatment position according to an example of the present invention.
Figure 6B:
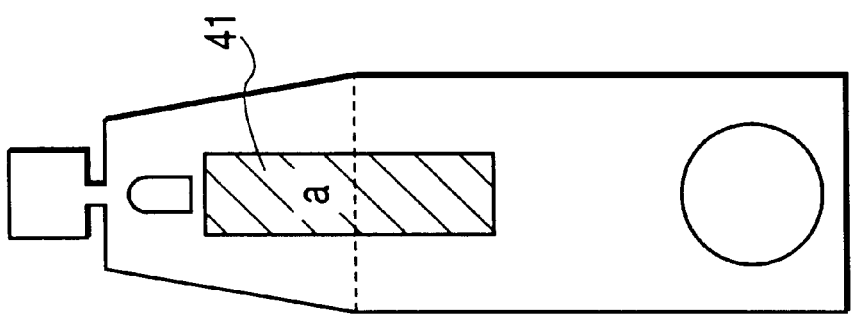
FIG. 6B is a case in which a damping material is pasted on a position "a" continuously on the bending part and FIG. 6C is a case in which the damping material is pasted on positions "b" and "c" separately on both sides of the bending part.
Figure 6C:
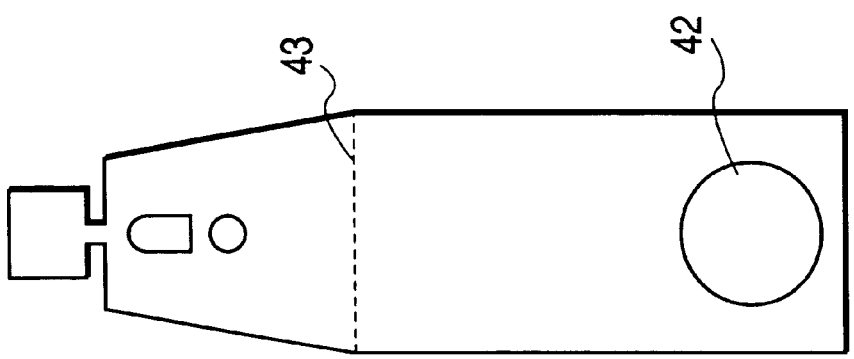

The damping treatment positions used in FIG. 5 are shown in FIGS. 6A to 6C. In FIGS. 6A to 6C, 41 is a damping material, 42 is a hole into which the fixing screw 33 of FIG. 5 is inserted and 43 is a bending part. FIG. 6A is a blank condition, FIG. 6B is a case in which the damping material 41 is pasted on the position "a" continuously on the bending part 43 and FIG. 6C is a case in which the damping material 41 is pasted on the positions "b" and "c" separately on both sides of the bending part 43. By fixing the base position of the suspension to the tip of the vibration exciter in this way, the vibration level at the center of the gimbal was measured.

Figure 7:
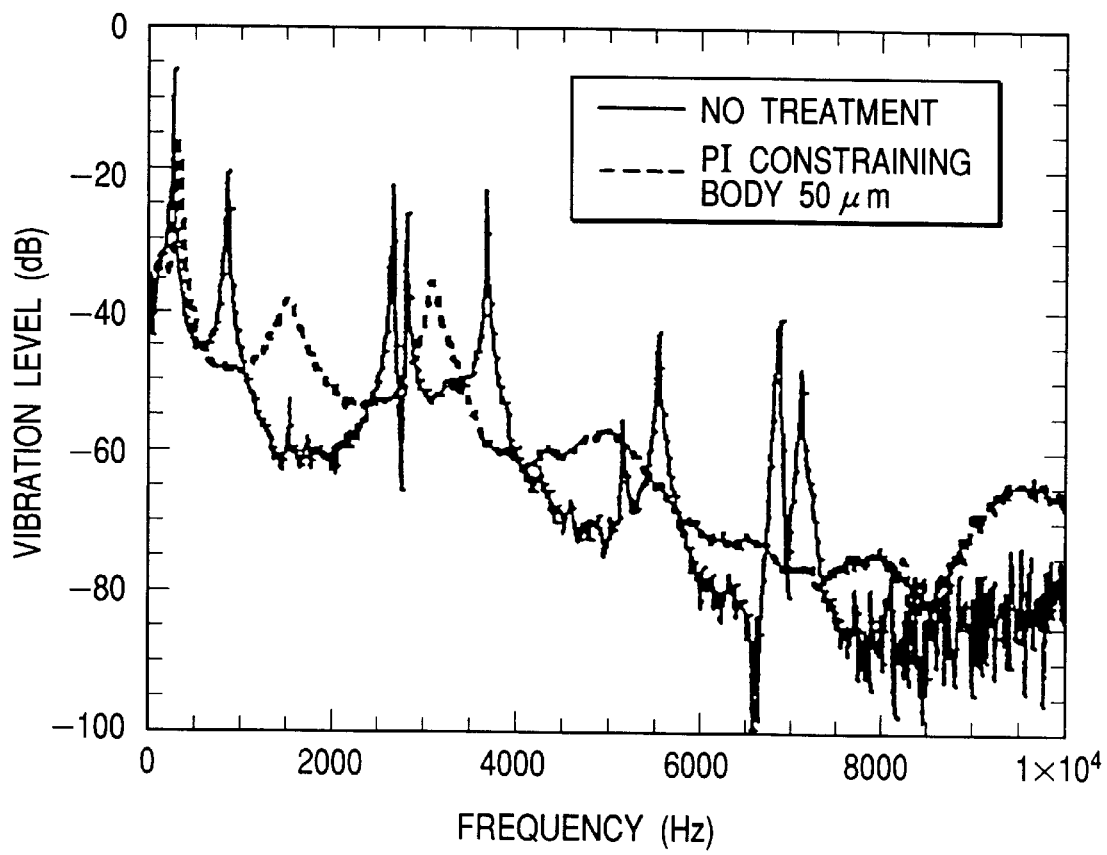
FIG. 7 is a graph showing vibration levels according to an example of the present invention.

FIG. 7 shows vibration levels when a PI damping material (thickness 50 μm) is pasted on the bending part in the manner as shown in FIG. 6B. In comparison with the case of no treatment, the vibration level at each resonance peak was reduced.

Figure 8:
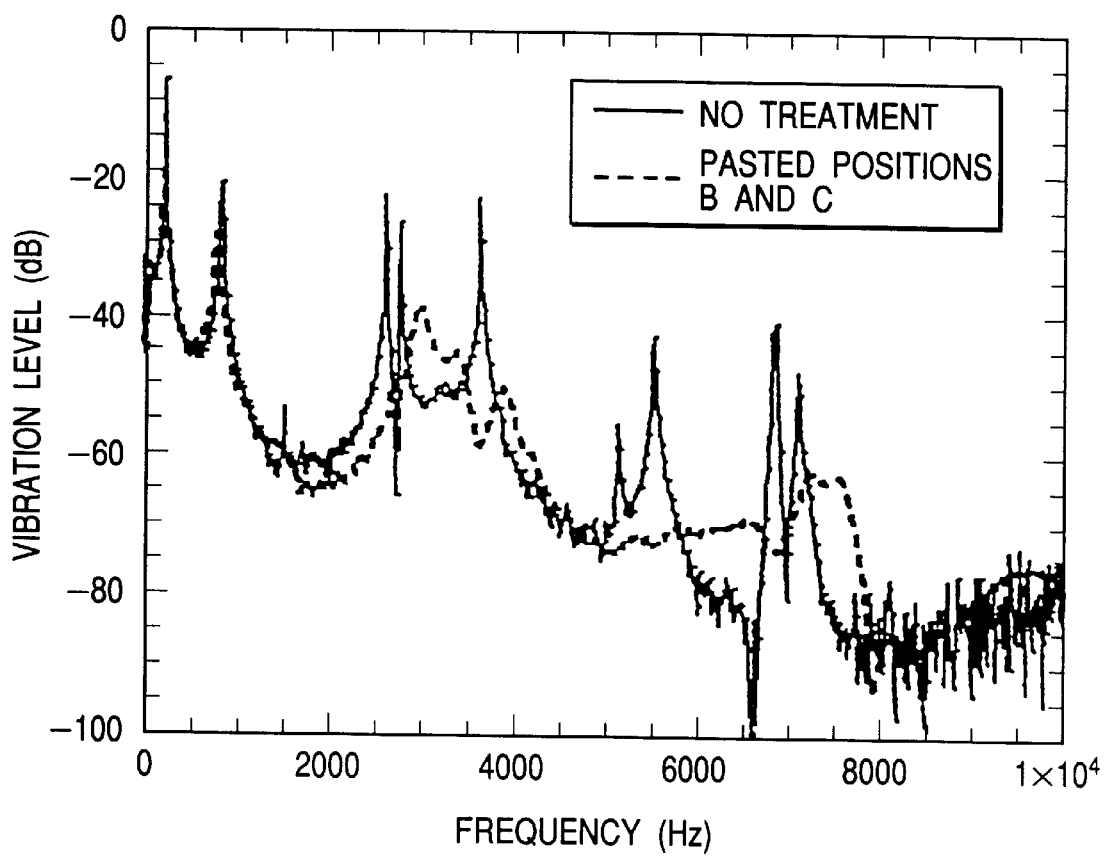
FIG. 8 is a graph showing vibration levels according to another example of the present invention.
Figure 9:
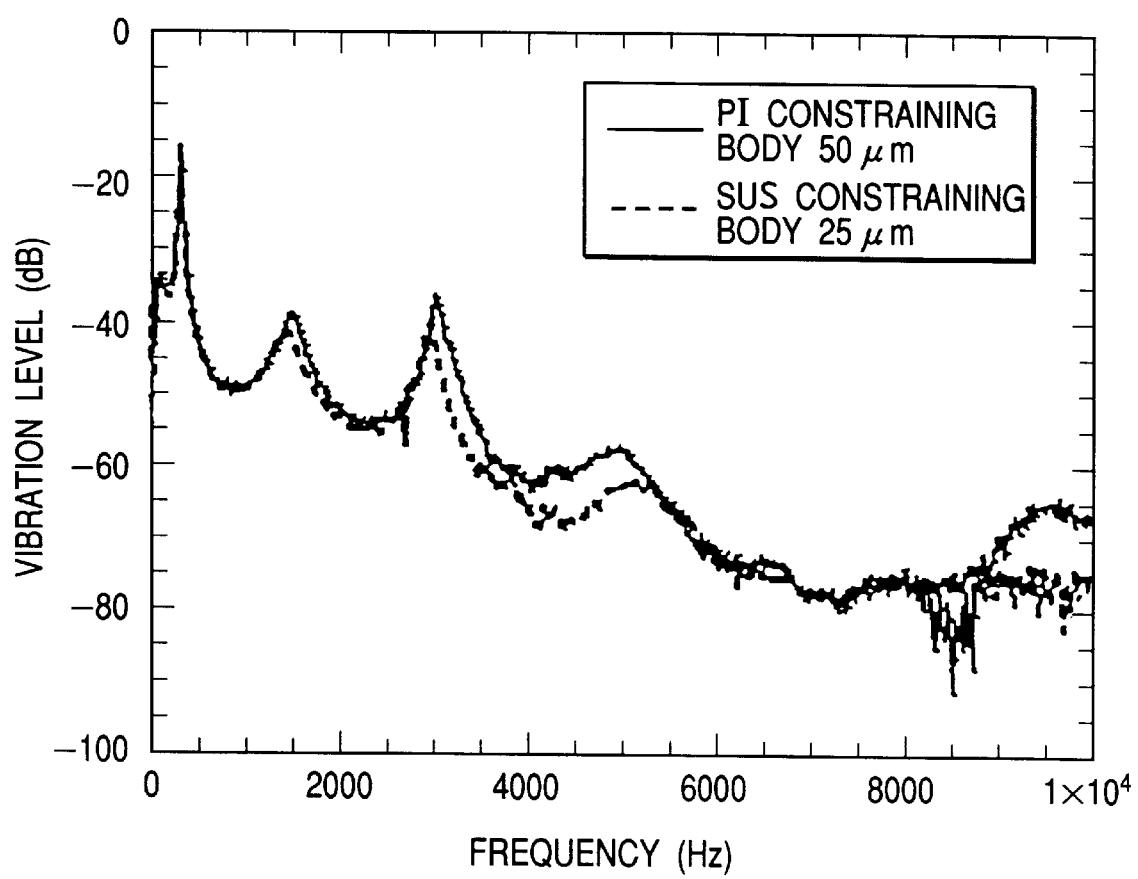
FIG. 9 is a graph showing vibration levels according to still another example of the present invention.
Figure 10C:
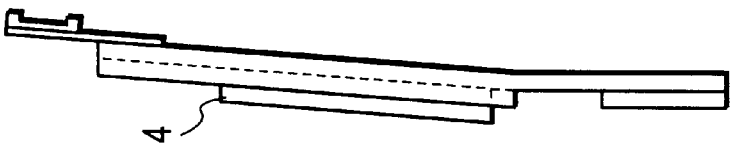
FIG. 10C is a side view of FIG. 10B.
Figure 10B:
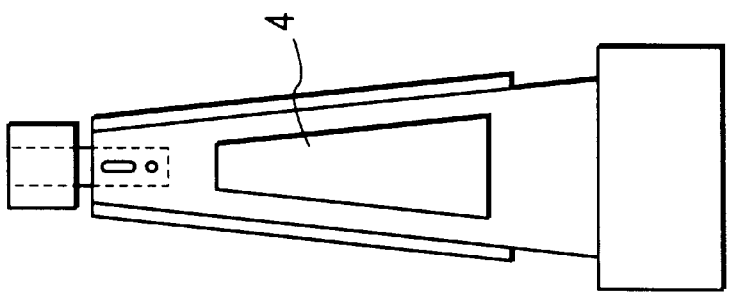
FIG. 10B is a front view of the head suspension after pasting of the damping material.
Figure 10A:
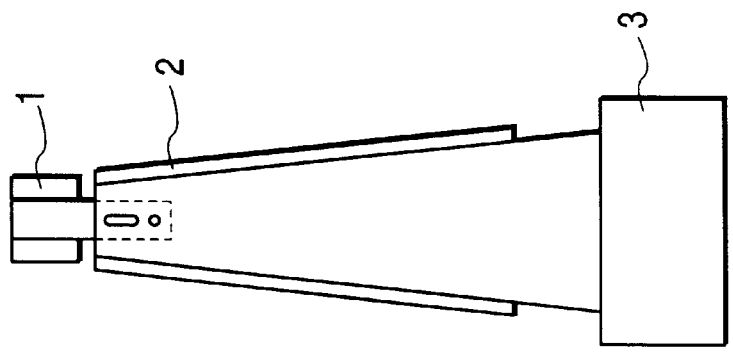
FIG. 10A is a front view of a head suspension before pasting of a prior art damping material.

Also, when the treatment was carried out by avoiding the bending part as shown in FIG. 6C, the secondary mode resonance peak was not reduced (FIG. 8).

In addition, when an SUS constraining layer was compared with a PI constraining layer, almost the same damping effect was obtained (FIG. 9).

As has been described in the foregoing, according to the head suspension of the present invention, a damping material is mounted over the flat part to the curved part of supporting arm of a head supporting spring of a disk unit, and rate of change in static spring constant of the head supporting spring mounted with the damping material is within 20% in comparison with the static spring constant of the unmounted head supporting spring, so that a light and low cost head suspension having superior damping effect can be provided.

When the damping material in the just described construction is a laminate in which a constraining body having a rigidity (modulus of elasticity×thickness) of 100 kg/mm or less and a visco-elastic body made of an acrylic adhesive are pasted together, a head suspension having more superior damping effect can be provided.

Next, according to the damping material of the present invention, a constraining body having a rigidity (modulus of elasticity×thickness) of 100 kg/mm or less is laminated with a visco-elastic body made of an acrylic adhesive, so that a light and low cost damping material having superior damping effect can be provided.

When thickness of the acrylic adhesive layer is within the range of from 20 to 250 μm in the just described construction, a damping material having more superior damping effect can be provided.

What is claimed is:

1. A head suspension for supporting a magnetic head of a disk unit, comprising:

a head supporting spring for supporting the magnetic head, the head supporting spring having a flat part and a curved part; and a damping material mounted over the flat part to the curved part of the head supporting spring;

wherein a rate of change in a static spring constant of the head supporting spring mounted with the damping material is within 20% in comparison with the static spring constant of the un-mounted head supporting spring, and further wherein the damping material is a laminate including a constraining body having a rigidity of 100 kg/mm or less, and a visco-elastic body made of an acrylic adhesive laminated on the constraining body.

2. The head suspension according to claim 1, wherein a thickness of the acrylic adhesive layer is within a range of from 20 to 250 μm.

3. The head suspension according to claim 1, wherein the constraining body is made of one of aluminum foil, copper foil, polyimide film, polyethylene terephthalate film and aramid film.

* * * * *